United States Patent [19]

Soules

[11] 4,004,861
[45] Jan. 25, 1977

[54] WIND DRIVEN PRIME MOVER

[76] Inventor: Charl Soules, 37 Kingsdale Ave., Willowdale, Ontario, Canada, M2N 3W3

[22] Filed: June 13, 1975

[21] Appl. No.: 586,541

[52] U.S. Cl. ............................... 416/41; 416/119; 416/140
[51] Int. Cl.² ........................................ F03D 7/06
[58] Field of Search ............. 416/41, 42, 119, 140, 416/197, 197 A, 9, 14, 17, 32, 37; 415/141, 2

[56] References Cited

UNITED STATES PATENTS

| 1,299,151 | 4/1919 | Ebert | 416/119 X |
| 1,341,045 | 5/1920 | Currey | 416/197 A |
| 3,093,194 | 6/1963 | Rusconi | 416/119 X |
| 3,942,909 | 3/1976 | Yengst | 416/119 X |

FOREIGN PATENTS OR APPLICATIONS

| 24,121 | 10/1936 | Australia | 416/119 |
| 35,860 | 3/1930 | France | 416/197 A |
| 701,036 | 3/1931 | France | 416/197 A |
| 264,219 | 1/1927 | United Kingdom | 416/41 |
| 270,858 | 5/1927 | United Kingdom | 416/119 |
| 304,514 | 1/1929 | United Kingdom | 416/119 |

*Primary Examiner*—Everette A. Powell, Jr.
*Attorney, Agent, or Firm*—George H. Riches

[57] ABSTRACT

A wind driven prime mover which is driven by a plurality of arcuately shaped wind vanes pivotally mounted on a rotatable turntable. The wind vanes are pivotally mounted on the turntable with their pivot axle disposed in a vertical plane. The pivots are positioned adjacent the periphery of the turntable, with the pivots being spaced equi-distant from each other and equi-distant from the axis of rotation of the turntable. The bottoms of the vanes are arcuately shaped, with the length of the arc being slightly longer than the space between the pivots so that there is an overlap between adjacent vanes. The convex surface of the vanes face outwardly to provide a concave inner surface.

6 Claims, 6 Drawing Figures

U.S. Patent    Jan. 25, 1977    Sheet 1 of 2    4,004,861
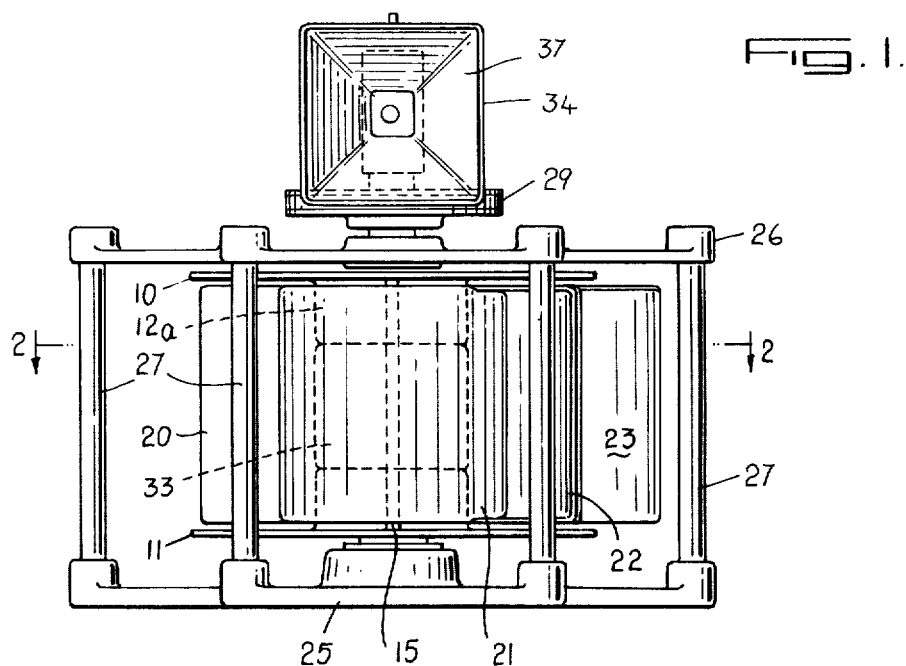
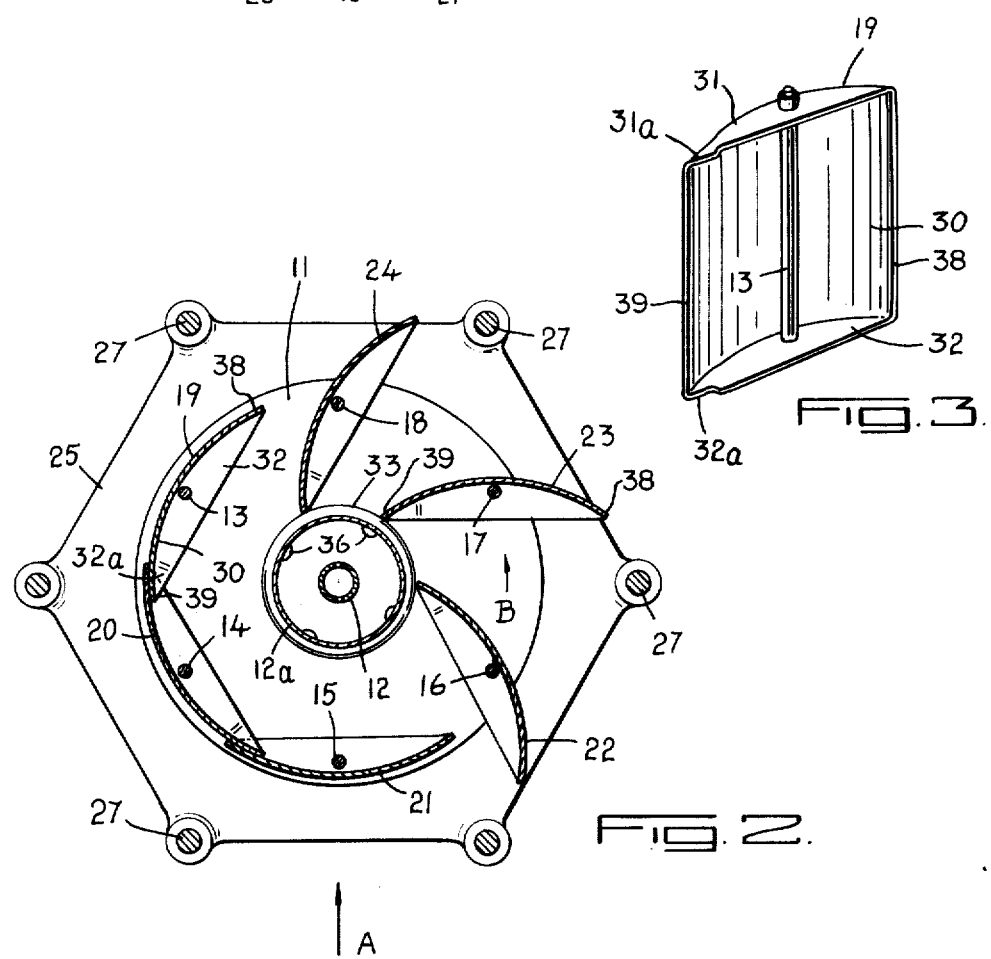

WIND DRIVEN PRIME MOVER

PRIOR ART

Wind driven power producing apparatus has been the subject of several prior patents. Amongst them are U.S. Pat. Nos. 556,803 dated Mar. 4, 1896; 1,334,845 dated Mar. 23, 1920; 2,106,557 dated Jan. 25, 1938 and 3,743,848 dated July 23, 1973. The last mentioned patent shows and describes a wind driven power producing apparatus in which substantially flat vanes are pivotally mounted on arms extending radially from the hub of a turntable. Several vanes are mounted on each arm. They are held in a fixed position by a releasable stop member but are provided with a voltage regulator which will automatically release the stop, in case of high winds, to allow the vanes to "feather".

OUTLINE OF THE INVENTION

This invention has, as one of its objects, a wind driven prime mover which has a rotary turntable provided with a new vane construction, and mounting therefor, in which the vanes open automatically to present maximum surface to the wind for approximately one-half turn of the turntable which is called the power phase, and then will automatically close or fold to present substantially no resistance to the wind, this portion of travel being called the idle phase. The vanes are specially shaped and pivotally mounted so that, when entering the power phase, they automatically pivot to the open or extended position to present a maximum surface to the wind. Of course, the opening will be gradual, the wind at first striking the inner surface of the vane at an oblique angle. When the vanes are fully open, the inner surface will be substantially perpendicular to the wind direction to give maximum thrust. Then as the vane enters the idle position, the vanes will leave the direct action of the wind and when fully in the idle position will be closed and held closed by the force of the wind against the outer convex surface of the vane. In fact, the vanes resemble the aerolons of an aircraft.

DESCRIPTION OF THE INVENTION

A preferred exemplification of the invention will be described with reference to the accompanying drawings in which:

FIG. 1 is a front elevation of a wind driven prime mover constructed in accordance with the invention;

FIG. 2 is a cross-section on the line 2—2 of FIG. 1;

FIG. 3 is a perspective view of one of the vanes;

Figure 4:
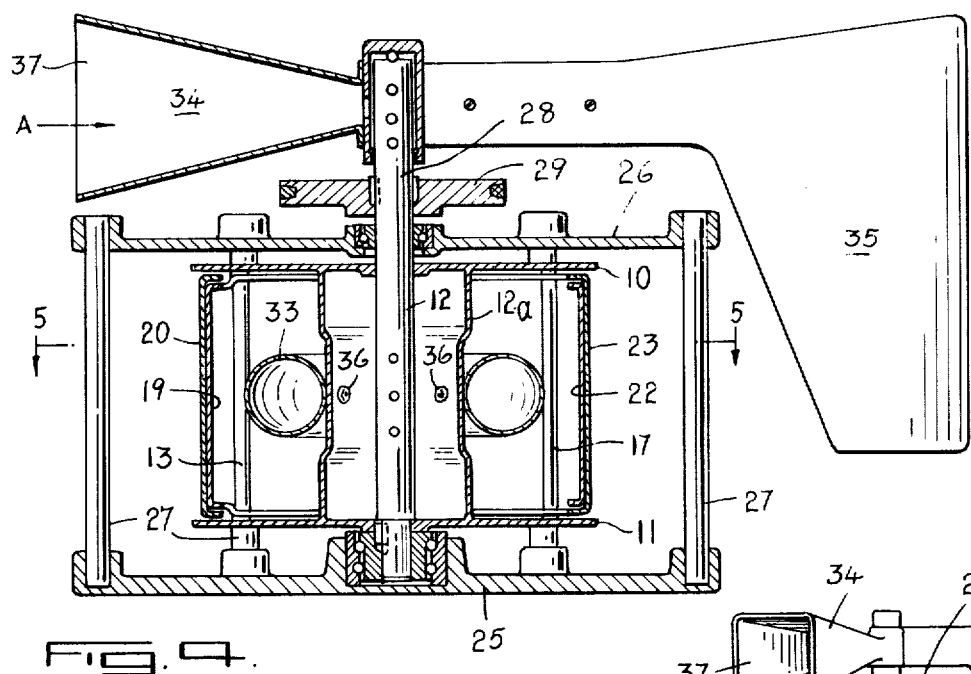
FIG. 4 is a vertical cross section with the vanes in closed position.

The power driven prime mover shown in the drawings includes a rotatable turntable consisting essentially of upper and lower circular plates 10, 11 respectively mounted in spaced apart relationship on a shaft 12, and a concentric hollow shaft 12a, the plates being held in spaced relationship by pivot pins 13 through 18 on which wind vanes 19 through 24 are pivotally mounted, said pins being located substantially centrally between the outside edge 38 and inside edge 39 of each blade. The pivot pins 13 through 18 are uniformly spaced circumferentially adjacent the periphery of the plates and equi-distant from the axis of rotation of the shaft 12. The wind vanes are automatically opened and closed by the wind action on the blades as will be described later.

The bottom end of the shaft 12 is suitable journalled in bearings housed within fixed base 25 and the upper end is journalled in a support plate 26 which is rigidly supported on columns 27 secured to and rising vertically from the base 25. The shaft 12 extends upwardly through the plate 26 to provide an extension 28 on which is mounted a driving member 29 which, for example, may take the form of a driving pulley or driven gear. The power take-off may be used to drive an electric generator or other type of mechanism.

The wind vanes 19 through 24 will now be described. In the present embodiment, there are six such vanes and as they are identical only one will be described, namely wind vane 19. Of course, it is to be understood that a lesser number may be used, providing that there are at least three such vanes. The wind vane 19 is substantially long longitudinally with an arcuate bottom 30, preferably but optionally on approximately the same radius as the plates 10, 11, and side pieces 31, 32. The leading portion of each vane is reduced in height as indicated at 31a, 32a, so that the leading portion of the vane can nest into the trailing portion of the vane immediately in front thereof. This construction provides the wind vane with an outer convex surface-an air flow surface-facing into the wind in the idle or closed position and a hollow concave air scoop facing into the wind when the vanes are open in the power phase as shown in FIG. 2. The length of the arc of the bottom is slightly greater than the spacing between a pair of adjacent pivots so that, when in the closed or idle position, the leading portion of one vane will nest under the trailing portion of the vane which is immediately in front of it, in the direction of the turn, as shown in FIG. 2 - see vanes 19 and 20. The distance of the pivots from the shaft 12 is of importance. It should be such that, when the vanes are in the fully open position (see vanes 22, 23, 24 in FIG. 2) the leading edge will engage against a sheath 33 enclosing the hollow shaft 12a which thus forms a stop.

FIGS. 1, 2, 4 and 5 illustrate a preferred means for automatically controlling the opening of the vanes in direct relationship to the wind velocity in order to protect the apparatus from damage. If the wind velocity is gentle, say about 6 miles per hour, the vanes will open to their full extent. However, as the wind increases in velocity the vanes will be prevented from opening to a more and more restricted amount until, with a high velocity, they will be prevented from opening and rotation of the turntable will stop. For this purpose, the sheath 33 is made of elastic material such as rubber enclosing the hollow shaft 12 so that it can be expanded by air pressure. The sheath is made air tight by fastening the top and bottom ends thereof tightly to the shaft. In this exemplification the shaft 12 is made hollow and provided with passages 36 to conduct air through the hollow shaft 12a into the sheath 33. Rotatably mounted on top of the shaft 12 is an air scoop 34 which has a fixed tail piece 35 that holds mount 37 constantly into the wind. The air scoop allows the wind to blow down through the shaft 12, through passages 36 to inflate the sheath in direct proportion to the velocity of the wind. Under a high velocity which would tend to destroy the apparatus, the sheath would be fully expanded to prevent the vanes from opening — see FIG. 5.

The power producing apparatus operates in the following manner. Referring to FIG. 2, it is to be assumed that the direction of the wind is indicated by arrows A which will cause the turntable to rotate counter clockwise as indicated by arrows marked B. The vane 21 soon after it passes the 6 o'clock position will be forced open by air pressure forcing its way between the trailing edge and the leading edge of vane 22 — vanes 22, 23, 24 are shown fully open. The vane 24 is shown in the 12 o'clock position and moving out of the working phase. As they move out of the working phase, the vanes will start to close so that when they reach the 9 o'clock position they will be closed or folded, in which position they will remain until they pass the 6 o'clock position.

Figure 6:
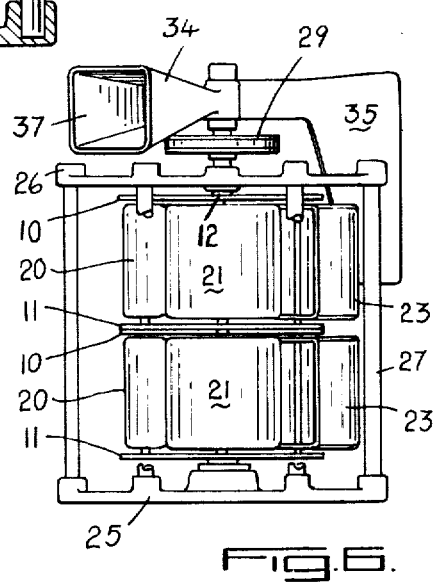
FIG. 6 shows, diagrammatically, two units in stacked relationship.
Figure 5:
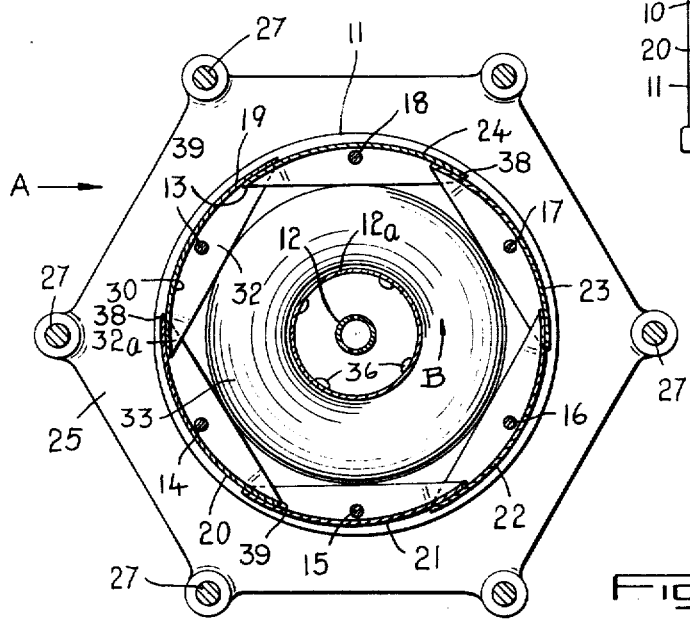
FIG. 5 is a cross-section on the line 5—5 of FIG. 4.

In the preceding description, a single unit has been described. It is to be understood, that for added power, a plurality of such units can be used either in side-by-side units operating together or in stacked relationship, i.e. one above the other, as shown in FIG. 6.

The embodiments of the invention in which an exclusive property or privilege is claimed are defined as follows:

1. In a wind driven power producing apparatus, a wind driven prime mover comprising a rotatable circular turntable having an axial (shaft) rotatably mounted on a fixed base, a plurality of arcuate shaped wind vanes automatically opened and closed solely by wind action, said vanes being pivotally mounted on the turntable (at right angles) parallel to the axis of rotation of the turntable, said pivots being located substantially centrally between the outside edge and inside edge of the vane, the vanes being of a length that in a closed position the (leading) inside edge of one vane will (overlap) underlie the (trailing) outside edge of the preceding vane and (stop means limiting the pivot movement of the vanes to an) in the open position in response to the wind velocity the inside edge will engage against the axial shaft.

2. In a wind driven power producing apparatus according to claim 1, in which the pivot of each vane is positioned adjacent the arcuate bottom and substantially equi-distant between the ends thereof, the pivots of the respective vanes being spaced equi-distant from each other and equi-distant from the axis of rotation of the turntable.

3. A wind driven power producing apparatus according to claim 1 in which the stop member comprises a rubber-like cushion enclosing said shaft to cushion the opening of said vanes.

4. A wind driven power producing apparatus according to claim 1, in which the stop member comprises an inflatable sheath enclosing said shaft and means automatically inflating said sheath relative to the wind velocity.

5. In a wind driven power producing apparatus, a wind driven prime mover comprising a circular turntable having an axial shaft rotatably mounted on a fixed base, a plurality of arcuate shaped wind vanes pivotally mounted on the turntable, the vanes being of a length that in a closed position the outside edge of one vane will underlie the inside edge of the preceding vane, stop means limiting the pivot movement of the vanes to an open position in response to wind velocity, said stop member comprising an inflatable sheath enclosing said shaft and means automatically inflating said sheath relative to the wind velocity.

6. In a wind driven power producing apparatus according to claim 5, in which the means for automatically inflating the sheath comprises an air scoop rotatably mounted atop said shaft, a wind tunnel through said scoop having its entrance constantly facing into the wind and its exit communicating through holes in said shaft with said sheath whereby the air pressure, created by the wind, within the sheath inflates and expands the sheath directly proportional to the wind velocity.

* * * * *

UNITED STATES PATENT OFFICE
CERTIFICATE OF CORRECTION

Patent No. 4,004,861　　　　　　　　Dated January 25, 1978

Inventor(s) Charl Soules

It is certified that error appears in the above-identified patent and that said Letters Patent are hereby corrected as shown below:

Claim 1, line 3, delete the parentheses about the word "shaft"

Claim 1, line 7, delete "(at right angles)"

Claim 1, line 11, delete "(leading)"

Claim 1, line 12, delete "(overlap)"
　　　　　　　　　　delete "(trailing)"

Claim 1, lines 13-14, delete "(stop means limiting the pivot movement of the vanes to an)"

Signed and Sealed this

*Twenty-seventh* Day of *June 1978*

[SEAL]

*Attest:*

RUTH C. MASON
*Attesting Officer*

DONALD W. BANNER
*Commissioner of Patents and Trademarks*